United States Patent
Patel et al.

(10) Patent No.: US 12,506,810 B2
(45) Date of Patent: Dec. 23, 2025

(54) SYSTEM AND METHOD FOR INTEGRATING REAL-WORLD INTERACTIONS WITHIN A METAVERSE

(71) Applicant: Bank of America Corporation, Charlotte, NC (US)

(72) Inventors: Priyeshkumar Chandrakant Patel, Hillsborough, NJ (US); Jitender Singh, Robbinsville, NJ (US); Matthew Blake Bledsoe, Charlotte, NC (US); Jennifer Corzo, Ewing, NJ (US); Scott Fletcher Davidson, Brooklyn, NY (US)

(73) Assignee: Bank of America Corporation, Charlotte, NC (US)

( * ) Notice: Subject to any disclaimer, the term of this patent is extended or adjusted under 35 U.S.C. 154(b) by 283 days.

(21) Appl. No.: 17/931,428

(22) Filed: Sep. 12, 2022

(65) Prior Publication Data
US 2024/0089327 A1 Mar. 14, 2024

(51) Int. Cl.
*H04L 67/131* (2022.01)
*G06F 3/04815* (2022.01)
*G06F 3/04817* (2022.01)
*H04L 12/18* (2006.01)
*H04L 65/403* (2022.01)
(Continued)

(52) U.S. Cl.
CPC ........ *H04L 67/131* (2022.05); *G06F 3/04815* (2013.01); *G06F 3/04817* (2013.01); *H04L 12/1818* (2013.01); *H04L 65/403* (2013.01); *G06Q 40/026* (2025.08); *G06Q 40/03* (2023.01)

(58) Field of Classification Search
CPC ............. G06F 3/04815; G06F 3/04817; G06F 3/0482; G06F 3/0484; G06F 3/04842; G06F 9/451; G06F 9/547; G06Q 20/108; G06Q 20/1085; G06Q 40/02; H04L 12/1813; H04L 12/1818; H04L 12/1822;
(Continued)

(56) References Cited

U.S. PATENT DOCUMENTS 9,874,867 B2  1/2018  Sait et al.
9,942,401 B2  4/2018  Odinak et al.
(Continued)

OTHER PUBLICATIONS

Priyeshkumar Chandrakant Patel, System, method and graphical user interface for providing a self-service application within a metaverse, U.S. Appl. No. 17/931,478, filed Sep. 12, 2022, pp. 1-41.

*Primary Examiner* — Linda Huynh (57) ABSTRACT

A system for integrating real-world interactions within a virtual environment comprises a processor associated with a server. The processor receives a request with a first user data from a user device to conduct a first interaction in a real-world environment. The processor processes a user profile and the first user data to generate a virtual meeting area with an entity avatar associated with an entity device. The processor sends a first mobile deep link to the user device to grant access to the virtual meeting area. The processor conducts a second interaction between the user device and the entity avatar in the virtual meeting area and obtains a second user data from the user device. The processor processes the user profile and the second user data to generate contextual objects on a display of the user device. The processor renders the contextual objects into an application profile.

18 Claims, 6 Drawing Sheets

(51) Int. Cl.
*G06Q 40/02* (2023.01)
*G06Q 40/03* (2023.01)

(58) Field of Classification Search
CPC ..... H04L 65/403; H04L 67/131; H04N 7/157; H04N 21/47805; H04N 21/4788
See application file for complete search history.

(56) References Cited

U.S. PATENT DOCUMENTS

| | | | |
|---|---|---|---|
| 10,037,138 | B2 | 7/2018 | Bernstein |
| 10,061,489 | B2 | 8/2018 | Stein et al. |
| 10,078,867 | B1* | 9/2018 | Chan ................ G06Q 40/02 |
| 10,127,224 | B2 | 11/2018 | Deleeuw |
| 10,354,256 | B1* | 7/2019 | McInerny ............ G06T 13/40 |
| 10,636,220 | B2 | 4/2020 | Gervasio et al. |
| 10,783,188 | B2 | 9/2020 | Wang |
| 10,791,176 | B2 | 9/2020 | Phipps et al. |
| 10,853,065 | B2 | 12/2020 | Corbal et al. |
| 10,868,879 | B2 | 12/2020 | Comstock et al. |
| 10,869,096 | B2 | 12/2020 | Moehrle |
| 11,048,473 | B2 | 6/2021 | Carson et al. |
| 11,088,971 | B2 | 8/2021 | Brody et al. |
| 11,126,825 | B2 | 9/2021 | Herold et al. |
| 11,197,145 | B2 | 12/2021 | Martin et al. |
| 11,360,644 | B2 | 6/2022 | Karunamuni et al. |
| 11,362,848 | B1 | 6/2022 | Lin et al. |
| 11,563,813 | B1 | 1/2023 | Bhushan et al. |
| 11,687,228 | B1* | 6/2023 | Swaminathan ........ G06F 3/011 715/769 |
| 12,155,765 | B1* | 11/2024 | Gao ..................... G06F 21/44 |
| 2011/0075819 | A1* | 3/2011 | Bruce ................ H04M 3/5191 379/88.04 |
| 2014/0315159 | A1* | 10/2014 | Mukherjee ............ G06F 3/167 434/107 |
| 2014/0317502 | A1* | 10/2014 | Brown .................. G10L 15/22 715/706 |
| 2015/0073907 | A1* | 3/2015 | Purves ................ G06Q 20/384 705/14.58 |
| 2015/0294405 | A1 | 10/2015 | Hanson et al. |
| 2016/0275760 | A1* | 9/2016 | Block .................. G07F 19/203 |
| 2017/0295119 | A1* | 10/2017 | Rosenberg ......... G06Q 30/0643 |
| 2018/0239837 | A1* | 8/2018 | Wang .................... G06F 16/17 |
| 2019/0005716 | A1* | 1/2019 | Singh .................... G06V 15/80 |
| 2019/0208029 | A1 | 7/2019 | Metral |
| 2019/0220247 | A1 | 7/2019 | Lemay et al. |
| 2019/0310757 | A1 | 10/2019 | Lee et al. |
| 2019/0362312 | A1* | 11/2019 | Platt .................... H04L 65/1069 |
| 2020/0244700 | A1* | 7/2020 | Moon .................... G06F 40/35 |
| 2020/0322320 | A1* | 10/2020 | Moon .................... G06F 21/40 |
| 2021/0004137 | A1* | 1/2021 | Oser .................. G06Q 30/0601 |
| 2021/0005022 | A1* | 1/2021 | Oser .................. G06Q 30/0281 |
| 2021/0373741 | A1* | 12/2021 | Agarawala ............ H04L 67/52 |
| 2022/0083995 | A1 | 3/2022 | Flowers et al. |
| 2022/0197403 | A1 | 6/2022 | Hughes et al. |
| 2022/0300127 | A1* | 9/2022 | Narukawa ........... H04L 12/1831 |
| 2022/0350460 | A1* | 11/2022 | Eckert .................... G06F 9/542 |
| 2023/0071584 | A1* | 3/2023 | Lebeau .................. H04N 7/157 |
| 2023/0086248 | A1* | 3/2023 | Puyol .................... G06F 9/451 715/848 |
| 2023/0092103 | A1* | 3/2023 | Puyol .................... G06F 3/011 715/205 |
| 2023/0153884 | A1* | 5/2023 | Parekh .................. G06Q 50/01 705/26.7 |
| 2023/0266826 | A1* | 8/2023 | Lopes .................. G06V 40/172 715/727 |
| 2023/0419618 | A1* | 12/2023 | Krenn .................. G06F 3/0483 |
| 2024/0048599 | A1* | 2/2024 | Yerli .................. H04L 12/1822 |

* cited by examiner

SYSTEM AND METHOD FOR INTEGRATING REAL-WORLD INTERACTIONS WITHIN A METAVERSE

TECHNICAL FIELD

The present disclosure relates generally to network communications and information security, and more specifically to a system and method for integrating real-world interactions within a metaverse.

BACKGROUND

An organization entity may interact with physical devices associated with users to provide services through different systems in a real-world environment and a virtual environment in a network. It is challenging to integrate the services involving communications in the real-world environment and the virtual environment due to lack of controlling data security, unauthorized access to different systems, preventing malicious activities, etc.

SUMMARY

Conventional technology is not configured to provide a reliable and efficient solution to integrating real-world interactions between physical devices within a virtual environment (e.g., such as a metaverse). The system described in the present disclosure is particularly integrated into a practical application of integrating real-world interactions within the virtual environment using a customized mobile deep link. The disclosed system is further integrated into an additional practical application of providing a self-service application within the virtual environment.

The disclosed system is configured to integrate a first interaction between a user device and an entity occurring in a real-world environment into a second interaction between the user device and an avatar associated with an entity device in a virtual environment. The disclosed system is configured to conduct the first interaction in response to receiving an interaction request for an application service from the user device in the real-world environment. The disclosed system is configured to process a user profile and user data to generate a virtual meeting area in the virtual environment. The disclosed system is configured to send a first customized mobile deep link to the user device. The first customized mobile deep link allows the user device to access the virtual meeting area to interact with the entity avatar in a virtual meeting area. The disclosed system is configured to present interaction objects associated with the user device and the entity avatar in the virtual meeting area on a graphical user interface (GUI) of the user device. The second interaction is conducted between the user device and the entity avatar in the virtual meeting area through the GUI. The disclosed system is configured to process the user profile and user data to present contextual objects on the GUI. The disclosed system is configured to render the contextual objects into an application profile to complete the application service.

Further, the disclosed system provides a self-service application within a virtual environment. The disclosed system is configured to generate a GUI to conduct the second interaction on a display of the user device. The disclosed system is configured to integrate a first video stream captured by the user device and a second video stream associated with the entity avatar in the virtual meeting area on the GUI of the user device. The disclosed system is configured to obtain a second user data from the user device to update the user profile in response to a request from the avatar. The disclosed system is configured to process the updated user profile to generate contextual objects on the GUI while the server processes the user data from the first video stream from the user device. The disclosed system is configured to render the contextual objects into an application profile to complete the application service.

In one embodiment, the system for integrating real-world interaction within the virtual environment comprises a processor and a memory. The processor receives an interaction request for an application service with a first user data from the user device to conduct a first interaction between the entity device and the user device. The processor processes the user profile and the first user data to generate a virtual meeting area with an entity avatar associated with the entity device. The virtual meeting area is configured to conduct a second interaction associated with the application service between the entity avatar and the user device in the virtual environment. The processor generates a first customized mobile deep link to the user device to grant access to the virtual meeting area to interact with the entity avatar in the virtual environment. The processor presents a plurality of interaction objects associated with the user device and the entity avatar in the virtual meeting area on a graphical user interface (GUI) of the user device. The processor conducts the second interaction between the user device and the entity avatar in the virtual meeting area through the GUI of the user device while processing the user profile and a first user data. The processor obtains a second user data associated with the application service from the user device to continue with the second interaction. The processor processes the user profile and the second user data to present a plurality of contextual objects on the GUI of the user device. The processor renders the plurality of the contextual objects into an application profile to complete the application service.

In one embodiment, the system is configured to provide a self-service application within the virtual environment. The processor generates a GUI to conduct the second interaction between the user device and the entity avatar on the GUI. The processor integrates a first video stream captured by the user device and a second video stream associated with the entity avatar to conduct the second interaction on the GUI of the user device. The processor generates contextual objects while processing the user profile and a first user data. The processor obtains a second user data from the first video stream from the user device and updates the user profile to continue with the second interaction. The processor processes the updated profile to generate the updated contextual objects on the GUI simultaneously while processing the user data from the first video stream from the user device. The server may present the contextual objects, the first video stream from the user device, and the second video stream associated with the avatar in the virtual meeting area on the GUI of the user device until the application service is completed. The processor renders the updated contextual objects into an application profile to complete the application service.

The practical application may be implemented by the processor of the server to integrate a first interaction occurring in a real-world environment into a second interaction in a virtual environment. For example, in response to receiving an interaction request with the first user data for an application service in the real-world environment, the disclosed system determines that the user profile including a first user data does not include data to implement the application service in a real-world environment. The disclosed system sends a first customized mobile deep link to the user device to grant access a virtual meeting area in the virtual environment. During the second interaction, the user may interact with the avatar presented on the GUI of the user device in the virtual meeting area. The video streams from the user device with the user and the video streams from the avatar are presented on the GUI of the user device. The user can interact with the avatar directly to provide user data to answer the questions asked by the avatar. The server processes the first video stream to obtain the updated user data and update the user profile accordingly. The user device may receive the application service results presented as contextual objects on the GUI simultaneously while the server processes the user data from the first video stream from the user device. The processor renders the plurality of the contextual objects into an application profile to complete the application service. In this way, the user may complete a self-service application with an avatar in the virtual environment and receive a corresponding application profile a second customized mobile deep link very fast and efficiently.

These practical applications lead to the technical advantage of improving an efficiency of application services provided by an entity and improving the overall computer system. The disclosed system integrates natural language-based interactions between a user device and the entity through a customized mobile deep link. The disclosed system integrates the first interaction with an entity occurring in the real-world environment into the second interaction with an entity avatar in the virtual environment. The disclosed system provides a faster application. The disclosed system provides customized user experience which allows the user to request for a self-service application and obtain application profiles faster and easier. For example, the user can complete self-service applications by communicating with an entity avatar in a virtual meeting area while receiving the application processing results on the GUI of the user device simultaneously. The self-service application can be completed for the user without a need to fill out and submit any data or application forms to the entity. The self-service applications may include completing secure online transitions, updating use accounts, and obtaining an application profiles, etc. Accordingly, the disclosed system conserves computer processing, memory utilization, and network resources.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide efficient and reliable solutions to integrate different services involving in communications in the real-world environment and the virtual environment integrating real-world. This disclosure presents a system in which real-world interactions are integrated within a virtual environment by referring to FIGS. 1 through 5.

Figure 1:
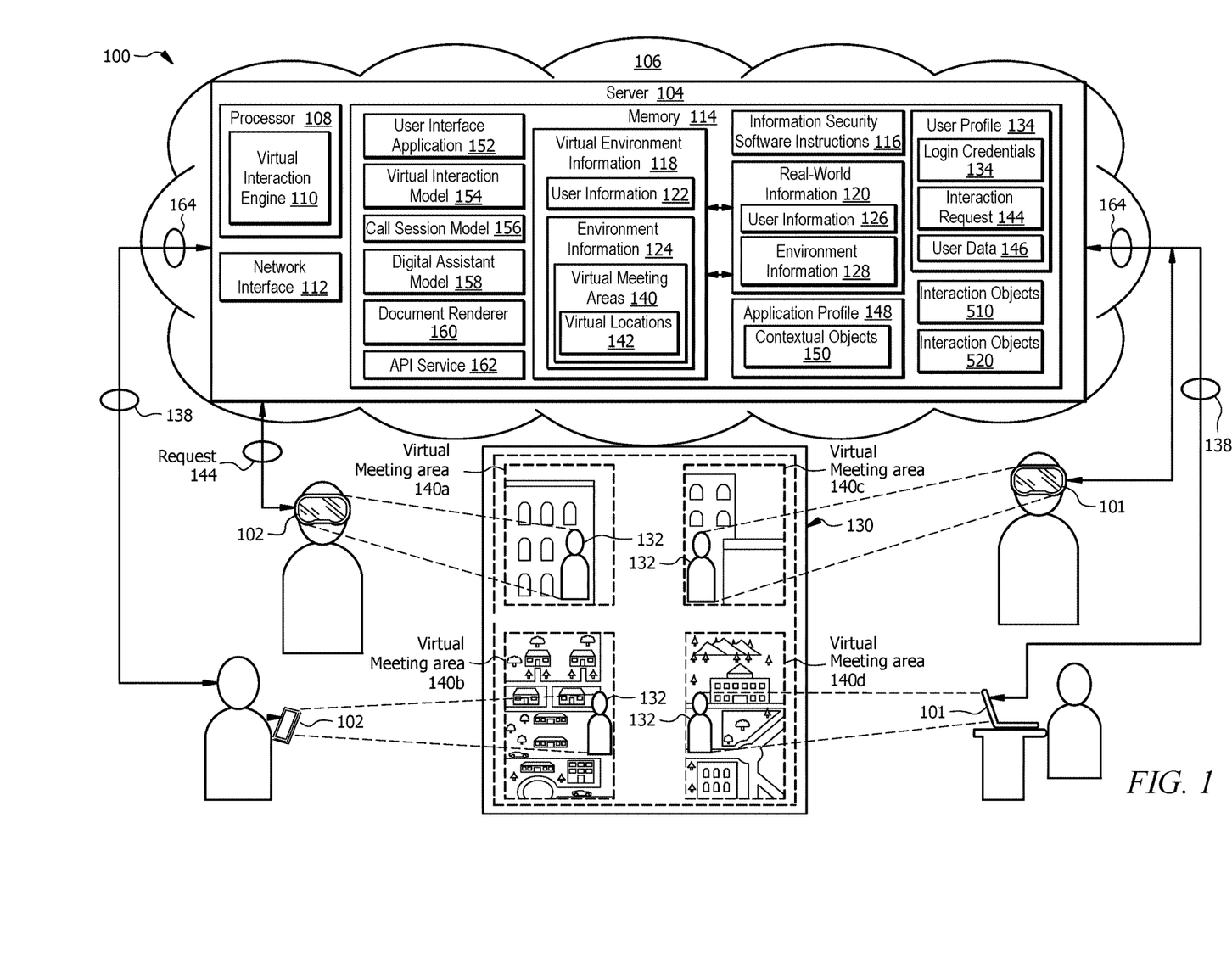
FIG. 1 illustrates an embodiment of a system configured to integrate real-world interactions within a virtual environment.

Example System for Integrating Real-World Interactions within a Virtual Environment FIG. 1 illustrates one embodiment of a system 100 that is configured to integrate real-world interactions within a virtual environment 130 in a network 106. In one embodiment, system 100 comprises a server 104, one or more entity devices 101, one or more user devices 102, and a network 106. The system 100 may be communicatively coupled to the network 106 and may be operable to transmit data between each entity device 101, each user device 102 and the server 104 through the network 106. Network 106 enables the communication between components of the system 100. Server 104 comprises a processor 108 in signal communication with a memory 114. Memory 114 stores information security software instructions 116 that when executed by the processor 108, cause the processor 108 to execute one or more functions described herein.

In some embodiments, the system 100 may be implemented by the server 104 to integrate a first interaction occurring in a real-world environment into a second interaction in a virtual environment 130. The server 104 may receive an interaction request 144 for an application service from the user device 102 to conduct a first interaction with an entity in the real-world environment. The server 104 may retrieve a user profile 134 stored in the memory 114 and receive a first user data 146a from a user device 102 during the first interaction. The server may update the user profile 134 with the first user data 146a. The server 104 may generate a virtual meeting area 140 with an entity avatar 132 associated with the entity device 101 while processing user profile 134 and the first user data 146a. The server 104 may send a first customized mobile deep link 138a to the user device 102 to grant access to the virtual meeting area 140. The server 104 may present interaction objects associated with the user device 102 and the entity avatar 132 in the virtual meeting area 140 on a graphical user interface (GUI) of the user device 102. The server 104 may conduct the second interaction between the user device 102 and the entity avatar 132 in the virtual meeting area 140. The entity avatar 132 may ask the user to answer one or more questions for implementing the application service and receive a second use data 146b from the user device 102. The server 104 may process the user profile 134 with the second user data 146b to generate contextual objects 150 on the GUI. In one embodiment, the server 104 may integrate a first video stream 164a captured by the user device 102 and a second video stream 164b associated with the entity avatar 132 to conduct the second interaction on the GUI of the user device 102. The server 104 may obtain a second user data from the first video stream 164a from the user device and update the user profile. The server may present the contextual objects, the first video stream 164a from the user device, and the second video stream 164b associated with the avatar in the virtual meeting area on the GUI of the user device in real time to continue with the second interaction. The server 104 may process the updated user profile to generate and present the contextual objects on the GUI. The server 104 may render the contextual objects 150 into an application profile 148 to complete the application service. The server 104 may send a second customized mobile deep link 138b associated with the application profile 148 to the user device 102.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality device, an augmented reality device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Each user device 102 is further configured to allow a user to send a request for the user device 102 to access and navigate through virtual meeting areas 140 in the virtual environment 130 to interact with the server 104. As another example, a user may use a user device 102 to send an interaction request 144 that requests a transfer of real-world resources and/or virtual resources between the user device 102 and the server 104. Example processes are described in more detail below.

Each user device 102 is configured to display a two-dimensional (2D) or three-dimensional (3D) representation of a virtual environment 130 to a user. Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. Within the virtual environment 130, each user may be associated with a user device 102 and an avatar 132. An avatar 132 is a graphical representation of the user device 102 and the user within the virtual environment 130. Examples of the avatars 132 include, but are not limited to, a person, an animal, or an object. In some embodiments, the features and characteristics of the avatar 132 may be customizable and user defined. For example, the size, shape, color, attire, accessories, or any other suitable type of appearance features may be specified by a user. By using the avatar 132, a user or the user device 102 can move within the virtual environment 130 to interact with an entity associated with the server 104 or other avatars 132 and objects within the virtual environment 130.

Figure 2:
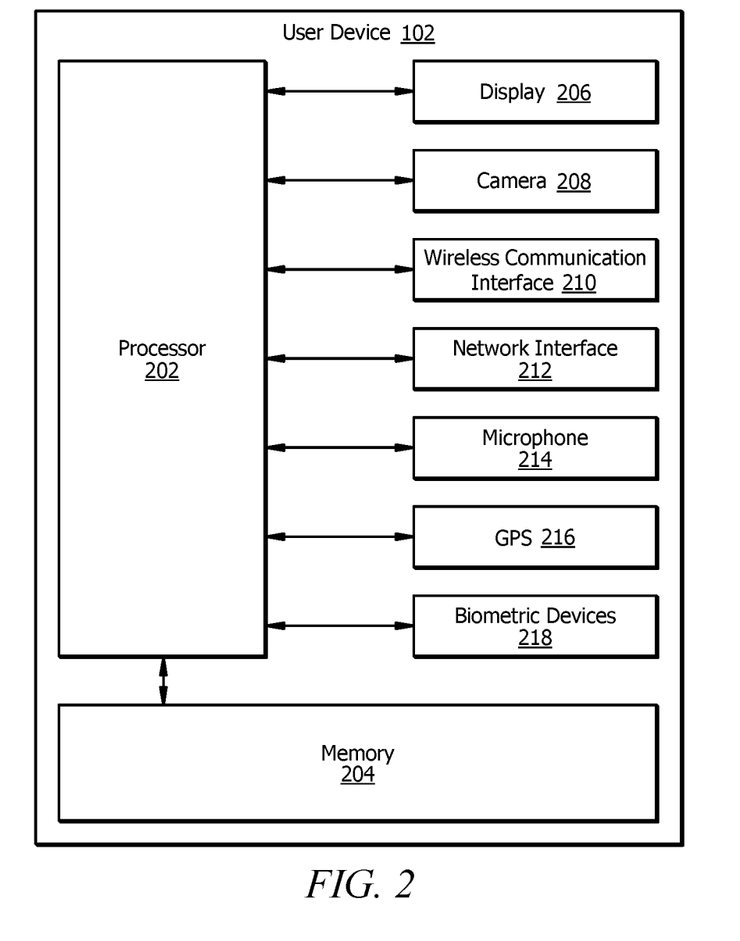
FIG. 2 is a block diagram of an example user device of the system of FIG. 1.

FIG. 2 is a block diagram of an embodiment of the user device 102 used by the system of FIG. 1. The user device 102 may be configured to display the virtual environment 130 (referring to FIG. 1) within a field of view of the user (referring to FIG. 1), capture biometric, sensory, and/or physical information of the user wearing and operating the user device 102, and to facilitate an electronic interaction between the user and the server 104.

The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1, 3A-3B, and 4-5. For example, processor 202 may be configured to display virtual objects on display 206, detect user location, identify virtual sub, capture biometric information of a user, via one or more of camera 208, microphone 214, and/or biometric devices 218, and communicate via wireless communication interface 210 with server 104 and/or other user devices.

The memory 204 is operable to store any of the information described with respect to FIGS. 1, 3A-3B, and 4-5 along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution.

Display 206 is configured to present visual information to a user (for example, user in FIG. 1) in an augmented reality, virtual reality, and/or metaverse environment that overlays virtual or graphical objects onto tangible objects in a real scene in real-time. In other embodiments, the display 206 is configured to present visual information to the user as the virtual environment 130 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 130.

Camera 208 is configured to capture images of a wearer of the user device 102. Camera 208 is a hardware device that is configured to capture images continuously, at predetermined intervals, or on-demand. For example, camera 208 may be configured to receive a command from the user to capture images of a user within a real environment. In another example, camera 208 is configured to continuously capture images of a field of view in front of the user device 102 and/or in front of the camera 208 to form a video stream of images. Camera 208 is communicably coupled to processor 202 and transmit the captured images and/or video stream to the server 104.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. Wireless communication interface 210 is configured to employ any suitable communication protocol.

The network interface 212 is configured to enable wired and/or wireless communications. The network interface 212 is configured to communicate data between the user device 102 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user. Microphone 214 is communicably coupled to processor 202.

GPS sensor 216 is configured to capture and to provide geographical location information. For example, GPS sensor 216 is configured to provide a geographic location of a user, such as user, employing user device 102. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. Biometric device 218 is communicably coupled to processor 202.

Server

Referring back to FIG. 1, the server 104 is a hardware device that is generally configured to provide services and software and/or hardware resources to user devices 102. The server 104 is generally a server, or any other device configured to process data and communicate with user devices 102 via the network 106. The server 104 is generally configured to oversee the operations of the virtual operation security engine 110, as described further below in conjunction with the operational flows of the methods 300A, 300B and 400 described in FIGS. 3A-3B and 4. In particular embodiments, the server 104 may be implemented in the cloud or may be organized in either a centralized or distributed manner.

The processor 108 is a hardware device that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. The processor 108 may be a special-purpose computer designed to implement the functions disclosed herein.

In an embodiment, the virtual operation security engine 110 is implemented using logic units, FPGAs, ASICs, DSPs, or any other suitable hardware. The virtual operation security engine 110 is configured to operate as described in FIGS. 3A-3B. The virtual operation security engine 110 may be configured to perform the operations of the methods 300A and 300B as described in FIGS. 3A-3B. For example, the virtual operation security engine 110 may be configured to provide multifactor authentication within a real-world environment and a virtual environment 130 for a user to access and interact with an entity in the virtual environment 130. As another example, the virtual operation security engine 110 may be configured to facilitate real-world resource and/or virtual resource transfers between users within a virtual environment 130.

The memory 114 stores any of the information described above with respect to FIGS. 1 through 5 along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116, user profile 134, application profile 148, contextual objects 150, virtual environment information 118, real-world information 120, avatars 132, virtual meeting areas 140 including corresponding virtual locations 142, virtual environment 130, and/or any other data or instructions. A user profile 134 includes login credentials 136, interaction requests 144, and user data 146. A user profile 134 further includes one or more of user identifiers, username, physical address, email address, phone number, and any other data, such as documents, files, media items, etc. The plurality of user profiles may be stored by the processor 108 in the memory 114. The login credentials 136 are associated with a user device 102 and are configured to register the user device 102 to interact with systems or platforms associated with an entity at a plurality of physical locations in a real-world environment. The login credentials 136 are configured to provide authentication for the user device 102 to communicate with an entity in a real-world environment and for an avatar 132 associated with the user device 102 to navigate in a virtual environment 130. The information security software instructions 116 may comprise any suitable set of instructions, logic, rules, or code operable to execute the virtual operation security engine 110. In an example operation, the memory 114 may store a user interface application 152, virtual interaction model 154, call session model 156, digital assistant model 158, document renderer 160, API service 162, and other program models which executed by the processor 108 to implement operational flows of the system of FIG. 1.

The virtual environment information 118 comprises user information 122 and environment information 124. The user information 122 generally comprises information that is associated with any user profiles associated with user accounts that can be used within a virtual environment 130. The environment information 124 include data of virtual meeting areas 140a-140d and corresponding virtual locations 142. For example, user information 122 may comprise user profile information, online account information, digital assets information, or any other suitable type of information that is associated with a user within a virtual environment 130. The environment information 124 generally comprises information about the appearance of a virtual environment 130. For example, the environment information 124 may comprise information associated with objects, landmarks, buildings, structures, avatars 132, virtual meeting areas 140, or any other suitable type of element that is present within a virtual environment 130. In some embodiments, the environment information 124 may be used to create a representation of a virtual environment 130 for users. In this case, a virtual environment 130 may be implemented using any suitable type of software framework or engine.

Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. For example, some virtual environment 130 may be configured to use gravity whereas other virtual environment 130 may not be configured to use gravity.

The real-world information 120 comprises user information 126 and environment information 128. The user information 126 generally comprises information that is associated with user profiles and user accounts that can be used within the real world. For example, user information 126 may comprise user profile information, account information, or any other suitable type of information that is associated with a user within a real-world environment. The environment information 128 generally comprises information that is associated with an entity within the real-world that the user is a member of or is associated with. For example, the environment information 128 may comprise physical addresses, GPS based locations, phone numbers, email addresses, contact names, or any other suitable type of information that is associated with an entity. Since the server 104 has access to both the virtual environment information 118 and the real-world information 120, the server 104 may link the virtual environment information 118 and the real-world information 120 together for a user such that changes to the virtual environment information 118 affect or propagate to the real-world information 120 and vice-versa. The server 104 may be configured to store one or more maps that translate or convert different types of interactions between the real-world environment 120 and the virtual environment 130 and vice-versa.

The network interface 112 is a hardware device that is configured to enable wired and/or wireless communications. The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Virtual Interaction Engine

Virtual Interaction Engine 110 engine may include, but is not limited to, one or more separate and independent software and/or hardware components of a server 104. In some embodiment, the virtual operation security engine 110 may be implemented by the processor 108 by executing the information security software instructions 116 to create a virtual environment 130 and generate a plurality of virtual meeting areas 140a-140d in the virtual environment 130. The virtual operation security engine 110 may be implemented by the processor 108 by executing the user interface application 152, call session model 156, and digital assistant model 158 and the virtual interaction model 154 to integrate a first interaction occurring in real-world environment into a second interaction within a virtual environment 130. In some embodiments, the virtual interaction model 154 may be executed by the processor 108 to provide a virtual interaction between the user device 102 and the entity device 101 associated with the entity in a virtual environment 130. The digital assistant model 158 may be executed by the processor 108 to interact with the user device 102 to provide one or more interactions associated with the entity. The call session model 156 may be executed by the processor 108 to conduct a call session to interact with the user device 102 to provide one or more interactions with the entity. The virtual operation security engine 110 may be implemented by the processor 108 to present a second interaction between a user device 102 and an entity avatar 132 in a virtual meeting area 140 on a GUI of the user device 102. The virtual operation security engine 110 may be implemented by the processor 108 to conduct a second interaction between a user device 102 and an entity avatar 132 in a virtual meeting area 140 through the GUI of the user device 102. The operation of the disclosed system 100 is described below.

Generating Virtual Meeting Areas

The server 104 may generate a virtual environment 130 based on the virtual environment information 118 and the real-world information 120. FIG. 1 illustrates an example of a plurality of virtual meeting areas 140 within a virtual environment 130. In some embodiments, the virtual environment 130 comprises a plurality of associated virtual meeting areas 140 (e.g., 140a-140d). Each virtual meeting area 140 may be configured to provide certain types interactions associated with an entity and corresponding interactions in a real-world environment. In one embodiment, the virtual meeting areas 140 may be configured and executed by the processor 108 to provide one or more application services and interactions provided by an entity at different physical locations in the real-world environment. The server 104 may be configured to store one or more maps executed by the processor 108 that translates or converts different types of interactions occurred in the virtual meeting areas 140 between the real-world and the virtual environment 130 and vice-versa.

Integrating Real-World Interactions Using Mobile Deep Links within a Virtual Environment This process may be implemented by the server 104 to send a first customized mobile deep link 138a to a user device 102 to integrate a first interaction occurring in a real-world environment into a second interaction in a virtual environment 130. The first customized mobile deep link 138a is configured to grant access to a virtual meeting area 140 to conduct the second interaction for implementing an application service. For example, the server 104 receives an interaction request 144 from a user device 102 through a digital assistance executed on the user device 102. The server 104 may conduct the first interaction between the user device 102 and entity device 101. The server 104 may process a user profile 134 and a first user data 146a to determine whether the application service can be implemented in the real-world environment. In response to determining that the application service may not be implemented in the real-world environment, the server 104 may generate a virtual meeting area 140 with an entity avatar 132 associated with the entity device 101. The server 104 may send a first customized mobile deep link 138a to the user device 102 to grant access to a virtual meeting area 140. In response to detecting the user device 102 access to the first customized mobile deep link, the server 104 may integrate the first interaction occurring in the real-world environment into the second interaction in the virtual meeting area 140 within the virtual environment. The server 104 may process the user profile 136 and the second user data 146b to generate a plurality of contextual objects 150. The server 104 may render the contextual objects 150 into an application profile 148 to complete the application service.

Generating a Graphical User Interface to Providing a Self-Service Application within a Virtual Environment The server 104 may generate a graphical user interface (GUI) to conduct a second interaction between the user device 102 and the entity avatar 132 in the virtual meeting area 140. The server 104 may integrate a first video stream 164a captured by the user device 102, a second video stream 164b associated with the entity avatar 132, and the contextual objects 150 on the GUI of the user device 102 in real-time during the second interaction. Through the GUI, the avatar 132 may interact with the user and ask one or more questions to complete the application service. The user may answer the questions to provide user data related to the application service. The server 104 may receive a second data 146b by processing the first video stream 164a from the user device 102. The server 104 may convert a natural language contents in the first video stream 164a into digital user data 146 to implement the application service. The server 104 may continuously update the user profile 134 based on the user data 146 from the first video stream 164a from the user device 102. The server 104 processes the updated user profile 134 to generate contextual objects 150 associated with the application service. The server 104 processes the updated user profile 134 to generate and present the updated contextual objects 150 on the GUI simultaneously while processing the second user data 146b from the first video stream 164a from the user device 102. The processor renders the updated contextual objects 150 into an application profile 148 to complete the application service.

Figure 3A:
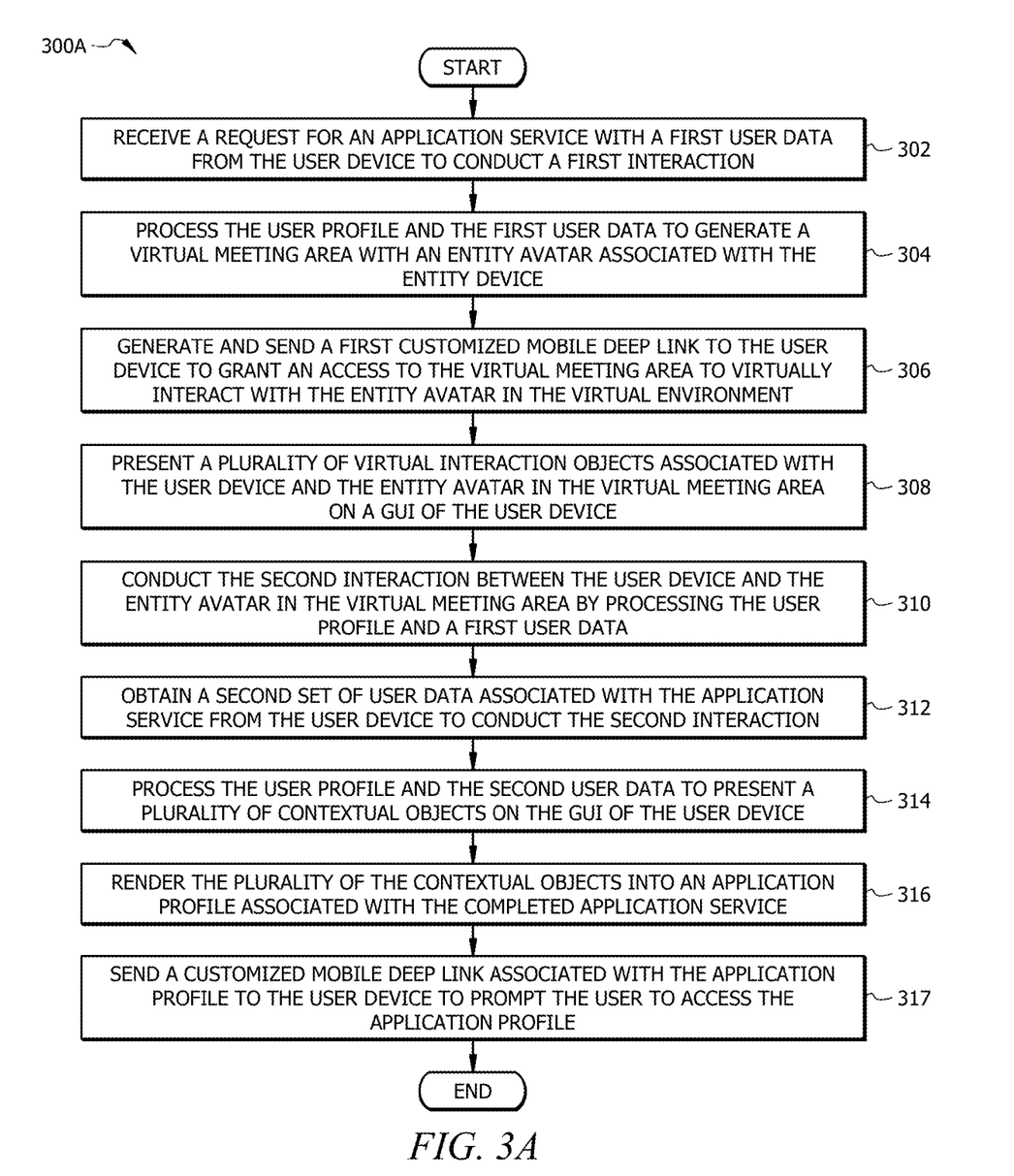
FIG. 3A illustrates an example operational flow of a method for integrating real-world interactions within the virtual environment.

Example Operational Flow for Integrating Real-World Interactions within a Virtual Environment FIG. 3A illustrates an example flow of a method 300A for integrating real-world interactions within a virtual environment 130 in the system 110. Modifications, additions, or omissions may be made to method 300A. Method 300A may include more, fewer, or other operations. For example, operations may be performed by the server 104 in parallel or in any suitable order. One or more operations of method 300A may be implemented, at least in part, in the form of information security software instructions 116 of FIG. 1, stored on non-transitory, tangible, machine-readable media (e.g., memory 114 of FIG. 1) that when run by one or more processors (e.g., processor 108 of FIG. 1) may cause the one or more processors to perform operations 302-316.

At operation 302, the server 104 receives an interaction request for an application service with a first user data 146a from the user device 102. The server 104 conducts a first interaction between an entity or the entity device 101 and the user device 102. For example, the server 104 may conduct the first interaction between the user device 102 and an entity through the user interface application 152 associated with the entity. The first interaction may be a natural language-based interaction.

At operation 304, the server 104 processes the user profile 134 and the first user data 146a to generate a virtual meeting area 140 with an entity avatar 132 associated with the entity device 101. The virtual meeting area 140 is configured to conduct a second interaction associated with the application service between the entity avatar 132 and the user device 102 in the virtual environment.

At operation 306, the server 104 generates a first customized mobile deep link 138a to the user device to grant access to the virtual meeting area 140 to interact with the entity avatar 132 in the virtual environment 130. In some embodiments, the first customized mobile deep link 138a may be configured to integrate the first interaction occurred in the real-world environment into the second interaction in the virtual meeting area 140 using an application programming interface (API) though an API service 162 via the network 106. For example, the server 104 is configured to send each customized access link as an encoded uniform resource locator (URL) link to the user device 102. In response to detecting a user device 102 access to the first customized mobile deep link, the server 104 may integrate the first interaction occurring in the real-world environment into the second interaction in the virtual meeting area 140 in the virtual environment 130.

At operation 310, the server 104 conducts the second interaction between the user device 102 and the entity avatar 132 in the virtual meeting area 140. The server 104 may process the user profile 134 and a first user data 146a to conduct the second interaction. In some embodiments, the server 104 may determine whether the first user data 146a comprises data to implement the application service during the second interaction. In response to determining that the first user data 146a comprises the data to implement the application service, the server 104 processes the user profile 134 and the first user data 146a to generate and present a plurality of contextual objects on the GUI 500 of the user device 101. Otherwise, the server 104 requests the user to provide the second user data 146a associated with the application service through the user device 102. The user may answer one or more question asked by the entity avatar 132. The second user data 146b may comprise one or more of textual data, audio data, or video data.

At operation 312, the server 104 obtains a second user data 146b associated with the application service from the user device 102 to continue with the second interaction. The server 104 obtains a second user data 146b based on the user answers to the questions of the avatar 132.

At operation 314, the server 104 processes the user profile 134 and the second user data 146a to present a plurality of contextual objects 150 on the GUI 500 of the user device 102. The server 104 may generate the plurality of the contextual objects 150 to implement the application service.

At operation 316, the server 104 may implement a document renderer 160 to render the plurality of the contextual objects into an application profile 148 to complete the application service. In one embodiment, at operation 317 the server 104 may send a second customized mobile deep link 138 b associated with the application profile 148 to the user device 102. The second customized mobile deep link 138 b is configured to execute on the user device 102 to prompt the user to access the application profile 148. In one embodiment, the server 104 may send the application profile 148 to the user device 102 in an electronic message.

Figure 3B:
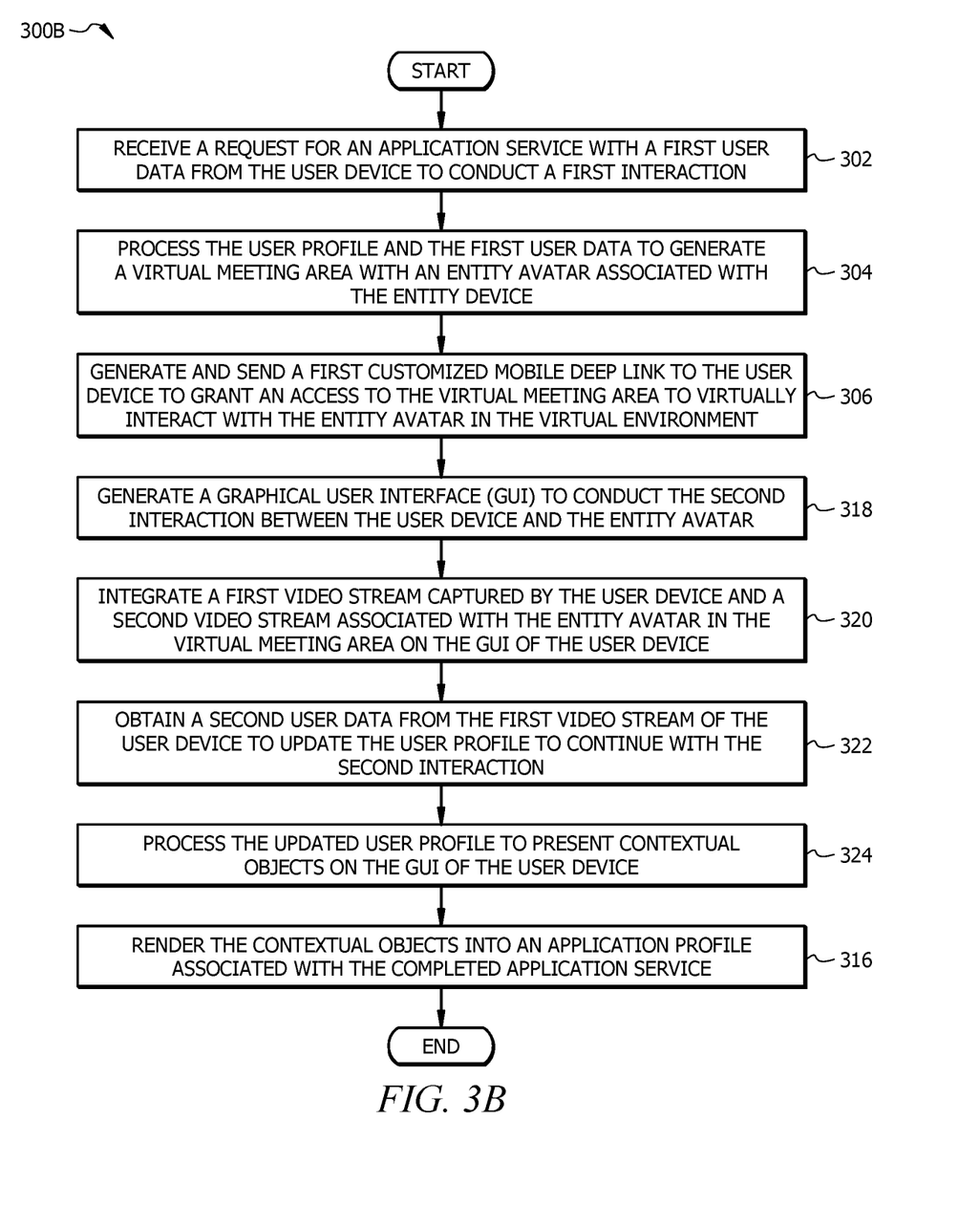
FIG. 3B illustrates an example operational flow of a method for providing a self-service application within the virtual environment.

FIG. 3B illustrates another example operational flow of a method 300B for providing a self-service application in a virtual environment 130. The example operational flow of the method 300B includes the same operations 302-306 and 316 from FIG. 3A and the additional operations 318-324. For example, one or more operations of method 300B may be implemented, at least in part, in the form of information security software instructions 116 of FIG. 1, stored on non-transitory, tangible, machine-readable media (e.g., memory 114 of FIG. 1) that when executed by one or more processors (e.g., processor 108 of FIG. 1) may cause the one or more processors to perform operations 302-306 and 316-324 in FIG. 3B.

Figure 5:
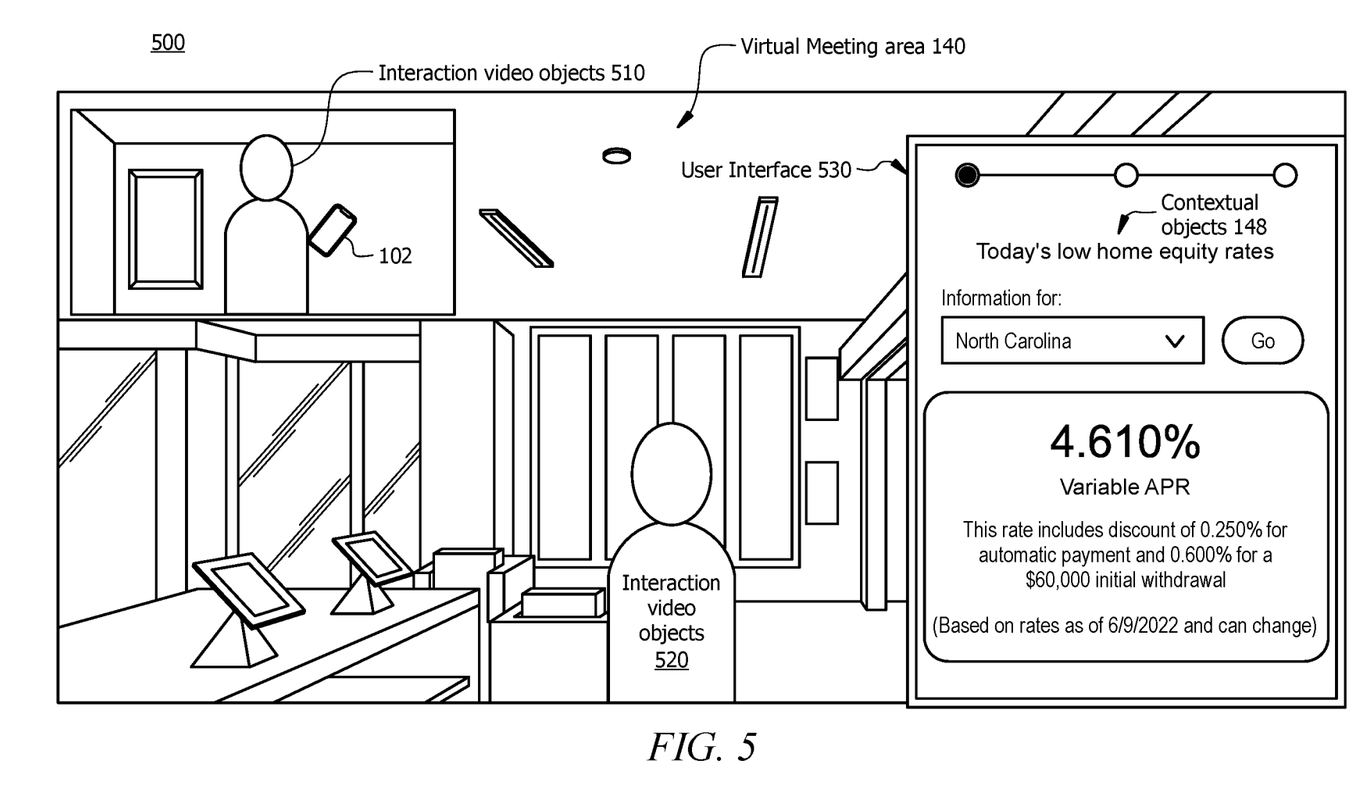
FIG. 5 illustrates diagram of an example graphical user interface of integrating real-world interactions and providing a self-service application within the virtual environment.

Continuing with operation 306 and at operation 318, the server 104 generates a GUI 500 to conduct the second interaction between the user device 102 and the entity avatar 132. FIG. 5 illustrates diagram of an example GUI 500 of integrating real-world interactions and providing a self-service application within the virtual environment 130. FIG. 5 will be described in detail below.

At operation 320, the server 104 integrates and presents a first video stream 164a captured by the user device 102 and a second video stream 164b associated with the entity avatar 132 in the virtual meeting area 140 on the GUI 500 of the user device 102 to conduct a second interaction. The second interaction may be a natural language-based interaction between the user device 102 and the avatar 132. The entity avatar 132 may ask the user to answer one or more questions for implementing the application service.

At operation 322, the server 104 receives the second user data 146b from the first video stream 164a of the user device 102. The server 104 may receive a second data 146b by processing the first video stream 164a from the user device 102. The second data 146b may include a natural language contents. The server 104 may convert natural language contents into digital user data 146 to implement the application service. The server 104 may update the user profile 134 with the second user data 146b received from the user device 102.

At operation 324, the server 104 processes the updated user profile 134 to present the updated contextual objects 150 associated with the application service on the GUI 500 of the user device 102. The server 104 may continuously receive the use data to update the user profile 134 and update contextual objects 150 on the GUI 500 until the application service is completed.

Referring back to operation 316 in FIG. 3B, the server 104 renders the updated contextual objects into an application profile 148 to complete the application service.

Figure 4:
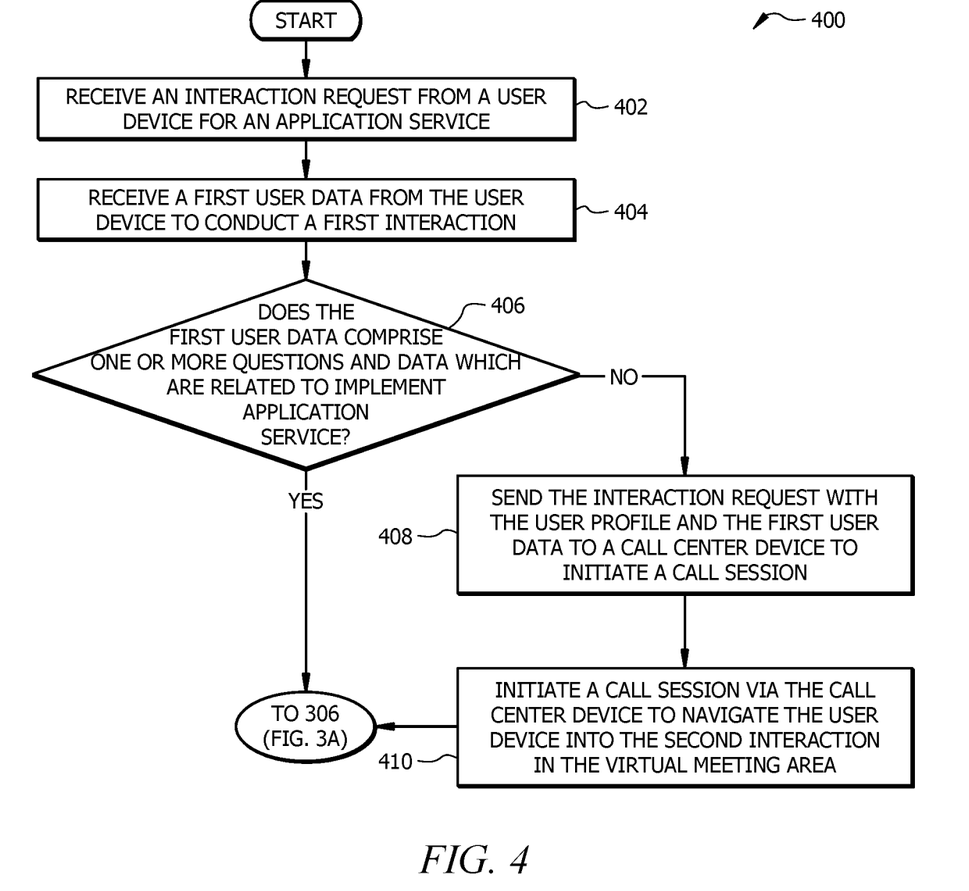
FIG. 4 illustrates an example backend operational flow of a method to facilitate integrating real-world interactions within the virtual environment.

Example Backend Operational Flow for Integrating Real-World Interactions within a Virtual Environment FIG. 4 illustrates an example backend operational flow of a method 400 to facilitate integrating real-world interactions within a virtual environment 130 in the system 110. The example backend operational flow of 400 is connected to operations of the methods 300A and 300B in FIGS. 3A-3B. Modifications, additions, or omissions may be made to the operational flow 400 of the method 400. The operational flow 400 from FIG. 4 may include more, fewer, or other operations. For example, operations may be performed in parallel or in any suitable order. One or more operations of the backend operational flow 400 from FIG. 4 may be implemented, at least in part, in the form of software instructions 116 of FIG. 1, stored on non-transitory, tangible, machine-readable media (e.g., memory 114 of FIG. 1) that when run by one or more processors (e.g., processor 108 of FIG. 1) may cause the one or more processors to perform operations 402-410.

At operation 402, the server 104 may receive an interaction request 144 from a user device 102 to interact with the entity for an application service. For example, the user device 102 may interact with the entity by logging in a digital assistant provided by the server 104. In one embodiment, the server 104 may process the user profile 134 to allow the user device 102 to interact with the entity through the digital assistant. The server 104 may present a user interface of the digital assistant on a display 206 of the user device 102 to interact with the user device 102.

At operation 404, the server 104 may receive the first user data 146a from the user device 102 through the user interface of the digital assistant. The server 104 may process the user profile 134 and the first user data 146a to conduct a first interaction between the user device 102 and the entity or the entity device 101. The first user data 146a may include natural language contents, such as textual data, audio data and video data. The first interaction may be a natural language-based interaction between the user device 102 and the digital assistant associated with the entity in real-time.

At operation 406, the server 104 determines whether the first user data 146a comprises one or more questions and data which are related to implement the application service by the digital assistance. In response to determining that the first user data 146a comprises one or more questions and data which are related to implement the application service, the process returns to operation 306 in FIG. 3A. The server 104 sends a first customized mobile deep link 138a to the user device 102 to grant access to enter a virtual meeting area 140.

At operation 408, in response to determining that the first user data 146a does not comprise one or more questions and data which are related to implement the application service, the server 104 sends the interaction request 144 with the user profile 134 and the first user data 146a to a call center device to initiate a call session.

At operation 410, the server 104 initiates a call session via the call center device to navigate the user device 102 in the real-world environment into the second interaction in the virtual meeting area 140 in the virtual environment 130. For example, the call center device may send a first customized mobile deep link 138a to the user device 102 to grant access to enter a virtual meeting area 140.

Referring to operation 318, the server 104 may generate the GUI 500 to present the second interaction on a display 206 of the user device 102.

FIG. 5 illustrates diagram of an example GUI 500 of integrating real-world interactions and providing a self-service application within the virtual environment 130. In some embodiments, the server 104 may generate interaction video objects 510, interaction video objects 520, and a user interface 530 to facilitate the second interaction.

The interaction video objects 510 may represent a first video stream 164a captured by the camera 208 of the user device 102 in a real-world environment during the second interaction. The interaction video objects 520 may present a second video stream 164b associated with the entity avatar 132 associated with the entity device 101 in the virtual meeting area 140 during the second interaction. The user interface 530 includes a plurality of contextual objects 150 which represent the result of application service. In one embodiment, the result of application service may be presented on a user interface 530 of the entity device 101.

In some embodiments, the server 104 may integrate the first video stream 164a and the second video stream 164b in the virtual meeting area 140 on the GUI 500 of the user device 102 to conduct the second interaction. For example, the avatar 132 may interact with the user in the virtual meeting area 140 and ask one or more questions to implement the application service. The user may answer the one or more questions to provide a second user data 146b related to the application service. The server 104 may obtain user data by processing natural language contents in the first video stream 164a from the user device 102. The server 104 may convert natural language contents into the second user data 146b to implement the application service.

The user interface 530 may include a plurality of contextual objects 150 which may be presented on a user interface of the entity device 101. The plurality of contextual objects 150 may be indicative of a completion of the application service in response to the interaction request 144. The server 104 may present the contextual objects 150, the first video stream 164a from the user device 102, and the second video stream 164b associated with the avatar 132 in the virtual meeting area 140 on the GUI 500 of the user device 102 until the application service is completed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory operable to store:
  a user profile comprising interaction data between a user device and an entity device, wherein the entity device is associated with an entity that provides a plurality of application services in a real-world environment; and
a processor operably coupled to the memory, the processor configured to:
  receive an interaction request for an application service from the user device to conduct a first interaction between the entity device and the user device in the real-world environment, wherein the first interaction comprises receiving a first user data from the user device;
  update the user profile with the first user data;
  process the user profile and the first user data to generate a virtual meeting area with an entity avatar associated with the entity device and a user avatar associated with the user device, wherein the virtual meeting area is configured to conduct a second interaction between the entity avatar and the user avatar in a virtual environment that is configured to present virtual objects onto real objects in the real-world environment in real-time;
generate and send a first customized mobile deep link to the user device to grant access to the virtual meeting area to interact with the entity avatar in the virtual environment;
present a plurality of interaction objects associated with the user device and the entity avatar in the virtual meeting area on a graphical user interface (GUI) of the user device;
conduct the second interaction between the user avatar and the entity avatar in the virtual meeting area through the GUI of the user device while processing the user profile and the first user data;
obtain a second user data associated with the application service from the user device;
update the user profile with the second user data;
process the user profile and the second user data to present a plurality of contextual objects on the GUI of the user device;
receive updated user data associated with the application service;
update the user profile with the updated user data;
present a plurality of updated contextual objects on the GUI of the user device based on the user profile and the updated user data; and
render the plurality of updated contextual objects into an application profile to complete the application service.

2. The system of claim 1, wherein the processor is further configured to:
in response to rendering the plurality of updated contextual objects into the application profile, send a second customized mobile deep link associated with the application profile to the user device, wherein the second customized mobile deep link is configured to execute on the user device to prompt a user to access the application profile via the user device.

3. The system of claim 1, wherein the processor is further configured to:
receive the interaction request for the application service with the first user data from the user device, wherein the first user data comprises one or more of textual data, audio data, or video data;
determine whether the first user data comprises one or more questions for implementing the application service;
in response to determining that the first user data comprises one or more questions for implementing the application service, send the first customized mobile deep link to the user device to grant access to enter the virtual meeting area to participate in the second interaction with the entity avatar; and
in response to detecting the user device accessing the first customized mobile deep link, integrate the first interaction between the entity device and the user device in the real-world environment into the second interaction in the virtual meeting area.

4. The system of claim 3, wherein the processor is further configured to:
in response to determining that the first user data does not comprise the one or more questions for implementing the application service,
send the interaction request with the user profile and the first user data to a call center device; and
initiate a call session via the call center device to navigate the user device in the real-world environment into the second interaction in the virtual meeting area in the virtual environment.

5. The system of claim 1, wherein the first customized mobile deep link is configured to integrate the first interaction between the entity device and the user device in the real-world environment into the second interaction in the virtual meeting area in the virtual environment using an application programming interface (API) through a network.

6. The system of claim 1, wherein the processor is further configured to:
determine whether the first user data comprises data to implement the application service in the second interaction between the user device and the entity avatar in the virtual meeting area;
in response to determining that the first user data comprises the data to implement the application service in the second interaction, process the user profile and the first user data to generate and present a plurality of contextual objects on the GUI of the user device; and
in response to determining that the first user data does not comprise the data to implement the application service in the second interaction, request a user to provide the second user data by the entity avatar to continue with the second interaction, wherein the second user data comprises one or more of textual data, audio data, or video data.

7. A method comprising:
receiving an interaction request for an application service from a user device to conduct a first interaction between an entity device and a user device in a real-world environment, wherein the first interaction comprises receiving a first user data from the user device;
updating a user profile with the first user data;
processing the user profile and the first user data to generate a virtual meeting area with an entity avatar associated with the entity device and a user avatar associated with the user device, wherein the virtual meeting area is configured to conduct a second interaction to implement the application service between the entity avatar and the user avatar in a virtual environment that is configured to present virtual objects onto real objects in the real-world environment in real-time;
generating and send a first customized mobile deep link to the user device to grant access to the virtual meeting area to interact with the entity avatar in the virtual environment;
presenting a plurality of interaction objects associated with the user device and the entity avatar in the virtual meeting area on a graphical user interface (GUI) of the user device;
conducting the second interaction between the user avatar and the entity avatar in the virtual meeting area through the GUI of the user device while processing the user profile and a first user data;
obtaining a second user data associated with the application service from the user device;
updating the user profile with the second user data;
processing the user profile and the second user data to present a plurality of contextual objects on the GUI of the user device;
receiving updated user data associated with the application service;
updating the user profile with the updated user data;

presenting a plurality of updated contextual objects on the GUI of the user device based on the user profile and the updated user data; and rendering the plurality of updated contextual objects into an application profile to complete the application service.

8. The method of claim 7, further comprising:

in response to rendering the plurality of updated contextual objects into the application profile, sending a second customized mobile deep link associated with the application profile to the user device, wherein the second customized mobile deep link is configured to execute on the user device to prompt a user to access the application profile via the user device.

9. The method of claim 7, further comprising:

receiving the interaction request for the application service with the first user data from the user device, wherein the first user data comprises one or more of textual data, audio data, or video data;

determining whether the first user data comprises one or more questions for implementing the application service;

in response to determining that the first user data comprises one or more questions for implementing the application service, sending the first customized mobile deep link to the user device to grant access to enter the virtual meeting area to participate in the second interaction with the entity avatar; and in response to detecting the user device accessing the first customized mobile deep link, integrating the first interaction between the entity device and the user device in the real-world environment into the second interaction in the virtual meeting area in the virtual environment.

10. The method of claim 9, further comprising:

in response to determining that the first user data does not comprise the one or more questions for implementing the application service, sending the interaction request with the user profile and the first user data to a call center device; and initiating a call session via the call center device to navigate the user device in the real-world environment into the second interaction in the virtual meeting area in the virtual environment.

11. The method of claim 7, wherein the first customized mobile deep link is configured to integrate the first interaction between the entity device and the user device in the real-world environment into the second interaction in the virtual meeting area in the virtual environment using an application programming interface (API) through a network.

12. The method of claim 7, further comprising:

determining whether the first user data comprises data to implement the application service in the second interaction between the user device and the entity avatar in the virtual meeting area;

in response to determining that the first user data comprises the data to implement the application service in the second interaction, processing the user profile and the first user data to generate and present a plurality of contextual objects on the GUI of the user device; and in response to determining that the first user data does not comprise the data to implement the application service in the second interaction, requesting a user to provide the second user data by the entity avatar to continue with the second interaction, wherein the second user data comprises one or more of textual data, audio data, or video data.

13. A non-transitory computer-readable medium that stores instructions that when executed by a processor, causes the processor to:

receive an interaction request for an application service from a user device to conduct a first interaction between an entity device and the user device in a real-world environment, wherein the first interaction comprises receiving a first user data from the user device;

update a user profile with the first user data;

process the user profile and the first user data to generate a virtual meeting area with an entity avatar associated with the entity device and a user avatar associated with the user device, wherein the virtual meeting area is configured to conduct a second interaction between the entity avatar and the user avatar in a virtual environment that is configured to present virtual objects onto real objects in the real-world environment in real-time;

generate and send a first customized mobile deep link to the user device to grant access to the virtual meeting area to interact with the entity avatar in the virtual environment;

present a plurality of interaction objects associated with the user device and the entity avatar in the virtual meeting area on a graphical user interface (GUI) of the user device;

conduct the second interaction between the user avatar and the entity avatar in the virtual meeting area through the GUI of the user device while processing the user profile and a first user data;

obtain a second user data associated with the application service from the user device;

update the user profile with the second user data;

process the user profile and the second user data to present a plurality of contextual objects on the GUI of the user device;

receive updated user data associated with the application service;

update the user profile with the updated user data;

present a plurality of updated contextual objects on the GUI of the user device based on the user profile and the updated user data; and render the plurality of contextual objects into an application profile to complete the application service.

14. The non-transitory computer-readable medium of claim 13, wherein the instructions when executed by the processor further cause the processor to:

in response to rendering the plurality of updated contextual objects into the application profile, send a second customized mobile deep link associated with the application profile to the user device, wherein the second customized mobile deep link is configured to execute on the user device to prompt a user to access the application profile via the user device.

15. The non-transitory computer-readable medium of claim 13, wherein the instructions when executed by the processor further cause the processor to:

receive the interaction request for the application service with the first user data from the user device, wherein the first user data comprises one or more of textual data, audio data, or video data;

determine whether the first user data comprises one or more questions which are qualified for implementing the application service;

in response to determining that the first user data comprises one or more questions for implementing the application service, send the first customized mobile deep link to the user device to grant access to enter the virtual meeting area to participate in the second interaction with the entity avatar; and in response to detecting the user device accessing the first customized mobile deep link, integrate the first interaction between the entity device and the user device in the real-world environment into the second interaction in the virtual meeting area in the virtual environment.

16. The non-transitory computer-readable medium of claim 15, wherein the instructions when executed by the processor further cause the processor to:

in response to determining that the first user data does not comprise the one or more questions for implementing the application service,
send the interaction request with the user profile and the first user data to a call center device; and
initiate a call session via the call center device to navigate the user device in the real-world environment into the second interaction in the virtual meeting area in the virtual environment.

17. The non-transitory computer-readable medium of claim 13, wherein the instructions when executed by the processor further cause the processor to:

determine whether the first user data comprises data to implement the application service in the second interaction between the user device and the entity avatar in the virtual meeting area;

in response to determining that the first user data comprises the data to implement the application service in the second interaction, process the user profile and the first user data to generate and present a plurality of contextual objects on the GUI of the user device; and in response to determining that the first user data does not comprise the data to implement the application service in the second interaction, request a user to provide the second user data by the entity avatar to continue with the second interaction, wherein the second user data comprises one or more of textual data, audio data, or video data.

18. The non-transitory computer-readable medium of claim 13, wherein the first customized mobile deep link is configured to integrate the first interaction between the entity device and the user device in the real-world environment into the second interaction in the virtual meeting area in the virtual environment using an application programming interface (API) through a network.

* * * * *